US006675097B2

United States Patent
Routh et al.

(10) Patent No.: US 6,675,097 B2
(45) Date of Patent: Jan. 6, 2004

(54) NONLINEAR CONSTRAINED INVERSION METHOD TO DETERMINE BASE OF SALT INTERFACE FROM GRAVITY AND GRAVITY TENSOR DATA

(75) Inventors: Partha Sarathi Routh, Ponca City, OK (US); Jerry Lee Kisabeth, Ponca City, OK (US); Gregory Joseph Jorgensen, Ponca City, OK (US)

(73) Assignee: Conoco Inc., Houston, TX (US)

( * ) Notice: Subject to any disclaimer, the term of this patent is extended or adjusted under 35 U.S.C. 154(b) by 0 days.

(21) Appl. No.: 10/236,204

(22) Filed: Sep. 6, 2002

(65) Prior Publication Data

US 2003/0060981 A1 Mar. 27, 2003

Related U.S. Application Data

(63) Continuation-in-part of application No. 09/580,863, filed on May 30, 2000, now Pat. No. 6,502,037, which is a continuation-in-part of application No. 09/285,570, filed on Apr. 2, 1999, now Pat. No. 6,278,948, and a continuation-in-part of application No. 09/399,218, filed on Sep. 17, 1999, now Pat. No. 6,424,918, and a continuation-in-part of application No. 09/405,850, filed on Sep. 24, 1999, now Pat. No. 6,430,507.
(60) Provisional application No. 60/318,083, filed on Sep. 7, 2001.

(51) Int. Cl.⁷ .............................. G01V 3/38; G01V 7/00
(52) U.S. Cl. ............................................................ 702/2

(58) Field of Search ................................ 702/2, 6, 7, 8, 702/11, 12, 13, 14, 16

(56) References Cited

U.S. PATENT DOCUMENTS 6,125,698 A * 10/2000 Schweitzer et al. ............ 702/2
6,278,948 B1 * 8/2001 Jorgensen et al. ............. 702/6

* cited by examiner

Primary Examiner—Donald E. McElheny, Jr.
(74) Attorney, Agent, or Firm—Madan, Mossman & Sriram, P.C.

(57) ABSTRACT

The present invention is a method for determining a parameter of interest of a region of interest of the earth using tensor data. At least one component of potential fields data is measured at a plurality of locations over a region of interest including a subterranean formation of interest. The potential fields data are selected from magnetic data and gravity data. An initial geophysical model is determined for the region including the subterranean formation of interest. For the model, geophysical tensor data is updated using a forward model at a plurality of locations using an interior method for constrained optimization. A difference between the estimated model value and the measured value of the potential field measurements are determined at the plurality of locations. Based on the this difference the geophysical model is updated. The model is iteratively updated and compared to the measured data until the differences reach an acceptable level and the parameter of interest has been determined.

80 Claims, 10 Drawing Sheets

NONLINEAR CONSTRAINED INVERSION METHOD TO DETERMINE BASE OF SALT INTERFACE FROM GRAVITY AND GRAVITY TENSOR DATA

CROSS REFERENCE TO RELATED APPLICATIONS

This application claims priority from U.S. Provisional App. Ser. No. 60/318,083 filed on Sep. 7, 2001.

This application is a Continuation-in-Part of U.S. Pat. No. 6,502,037. App. Ser. No. 09/580,863 filed on May 30, 2000, now U.S. Pat. No. App. Ser. No. 09/580,863 is a Continuation-in-Part of U.S. patent App. Ser. No. 09/285,570 filed on Apr. 2, 1999, now U.S. Pat. No. 6,278,948; App. Ser. No. 09/399,218 filed on Sep. 17, 1999, now U.S. Pat. No. 6,424,918; and U.S. patent App. Ser. No. 09/405,850 filed on Sep. 24, 1999, now U.S. Pat. No. 6,430,507.

App. Ser. No. 09/399,218 filed on Sep. 17, 1999, now U.S. Pat. No. 6,424,918 and U.S. patent App. Ser. No. 09/405,850 filed on Sep. 24, 1999, now U.S. Pat. No. 6,430,507 are both Continuation-in-Part applications of U.S. patent App. Ser. No. 09/285,570 filed on Apr. 2, 1999, now U.S. Pat. No. 6,278,948.

BACKGROUND OF THE INVENTION

1. Field of the Invention

The present invention pertains to processing gravity and magnetic data using vector and tensor data along with seismic data and more particularly to the inversion of gravity and magnetic data and combining with seismic data for hydrocarbon exploration and development, and to detect abnormally pressured subterranean formations in general, and with specific application to areas underneath and around anomalies such as salt, igneous or magmatic formations.

2. Related Prior Art

In exploration for hydrocarbons in subsurface environments containing anomalous density variations has always presented problems for traditional seismic imaging techniques by concealing geologic structures beneath zones of anomalous density. Many methods for delineating the extent of the highly anomalous density zones exist.

U.S. Pat. No. 4,987,561, titled "Seismic Imaging of Steeply Dipping Geologic Interfaces, issued to David W. Bell, provides an excellent method for determining the side boundary of a highly anomalous density zone. This patent locates and identifies steeply dipping subsurfaces from seismic reflection data by first identifying select data which have characteristics indicating that seismic pulses have been reflected from both a substantially horizontal and a steeply dipping interface. These data are analyzed and processed to locate the steeply dipping interface. The processed data are displayed to illustrate the location and dip of the interface. This patent, while helping locate the boundaries, provides nothing to identify the subsurface formations on both sides of the boundary.

There have also been methods for identifying subsurface formations beneath anomalous zones using only seismic data to create a model and processing the data to identify formations in light of the model. By further processing reflection seismic data, the original model is modified or adjusted to more closely approximate reality.

An example of further processing seismic data to improve a model is U.S. Pat. No. 4,964,103, titled "Three Dimensional Before Stack Depth Migration of Two Dimensional or Three Dimensional Data," issued to James H. Johnson. This patent provides a method of creating a three-dimensional model from two dimensional seismic data. This is done by providing a method of ray tracing to move before stack trace segments to their approximate three-dimensional position. The trace segments are scaled to depth, binned, stacked and compared to the seismic model. The model can then be changed to match the depth trace segments that will be stacked better, moved closer to their correct three-dimensional position and will compare better to the model. This patent uses a rather extensive seismic process to modify a seismic model that may be inaccurate.

One source of geologic exploration data that has not been used extensively in the past is potential fields data, such as gravity and magnetic data, both vector and tensor data and using potential fields data in combination with seismic data to provide a more accurate depth model or to derive a velocity model.

Gravity gradiometry has been in existence for many years although the more sophisticated versions have been held as military secret until recently. The measurement of gravity has become more acceptable in the late eighteen hundreds when measuring instruments with greater sensitivity were developed. Prior to this time, while gravity could be measured, variations in gravity caused by the effect of a large nearby object at one location, the gravity gradient, could not be reliably measured.

It has been known since the time of Sir Isaac Newton that bodies having mass exert a force on each other. The measurement of this force can identify large objects having a change in density even though the object is buried beneath the earth's surface or in other ways out of sight.

Exploration for hydrocarbons in subsurface environments containing anomalous density variations such as salt formations, shale diapers and high pressure zones create havoc on seismic imaging techniques by concealing geologic structures beneath zones of anomalous density. By utilizing gravity, magnetic and tensor gravity field measurements along with a robust inversion process, these anomalous density zones can be modeled. The spatial resolution obtained from this process is normally much lower resolution than that obtained from reflection seismic data. However, models obtained from gravity and magnetic data can provide a more accurate starting model for the seismic processing. Using the potential fields data models as a starting point for two dimensional and three dimensional seismic depth imaging greatly enhances the probability of mapping these concealed geologic structures beneath the zones of anomalous density.

Zones of anomalous density may also be associated with zones of anomalous fluid pressure. Typically, while drilling an oil or gas well, the density of the drilling mud must be controlled so that its hydrostatic pressure is not less than the pore fluid pressure in any formation along the uncased borehole. Otherwise, formation fluid may flow into the wellbore, and cause a "kick." Kicks can lead to blowouts if the flow is not stopped before the formation fluid reaches the top of the well. If the fluid contains hydrocarbons, there is a serious risk of an explosion triggered by a spark. For this reason, wellbores are drilled with a slight excess of the borehole fluid pressure over the formation fluid pressure.

A large excess of the borehole fluid pressure over the formation fluid pressure, on the other hand, is also undesirable. Fractures in the borehole wall may result in loss of circulation of the drilling fluid, resulting in stuck drill strings. Even if drilling can be continued, it is slowed down, resulting in greater costs. Serious formation damage may also occur.

Pressure prediction is done by estimating certain key parameters that include the overburden stress or confining stress, which is defined as the total lithostatic load on a rock volume at a given depth, and the effective stress, which is defined as the net load on the grain framework of the rock at a given depth. These two relations are then used in the Terzaghi effective stress law to estimate the fluid or pore pressure. Terzaghi's law states that:

$$Pc=Pe+Pp$$

where:

(Pc)=the confining stress (Pe)=the stresses born by the grains, and (Pp)=the stress born by the fluid.

Some workers treat a special case of Terzaghi's law where the confining stress is assumed to be the mean stress as opposed to the vertical confining stress. It should be acknowledged that this difference exists, but that it does not effect the embodiments of the present invention as they will pertain to estimating the total overburden load, which can then be converted to either vertical confining stress or mean stress based on the stress state assumptions that are made. The current prior art used for estimating confining stress is to use a density log from a nearby calibration well and integrate the density data to obtain the overburden load. This calibration was then applied from the mudline down to depths usually beyond the depth of sampling to predict the overburden away from the calibration well.

It has long been recognized that velocities of seismic waves through sedimentary formations are a function of "effective stress," defined as the difference between the stress caused by the overburden and the pore fluid pressure. A number of methods have been used to measure the seismic velocities through underground formations and make an estimate of the formation fluid pressure from the measured velocities. Plumley (1980) and U.S. Pat. No. 5,200,929 issued to Bowers, (the '929 patent) describe a method for estimating the pore fluid pressure at a specified location. The method also accounts for possible hysteresis effects due to unloading of the rock formation. The method utilized a pair of sonic velocity-effective stress relations. One relationship is for formations in which the current effective stress is the highest ever experienced. A second relationship is used when the effective stress has been reduced from the maximum effective stress experienced by the rock and hysteresis must be accounted for.

The '929 patent uses density data from nearby wells or from a geologically similar well to obtain the overburden stress. In most circumstances, the overburden stress may be adequately described by general compaction models in which the density increases with depth, giving rise to a corresponding relation for the relation between depth and overburden. In the absence of well control, determination of the overburden stress even within a sedimentary column is problematic. Furthermore, there are circumstances in which the model of a density that increases uniformly with depth is not valid. In such cases, the assumption of increasing density with depth is violated and a different approach to estimation of the overburden stress is needed.

There are several types of situations that may arise wherein a model of density increasing with depth and compaction is not valid. In the first case, there is a region of abnormally high density in the subsurface, usually of magmatic origin. The region could consist of an extrusive or intrusive volcanic material having relative density of 2.8 or higher. When such a formation is present within a sedimentary section where the relative density is typically between 2.4 and 2.65, the result is an increase in the overburden stress underneath the formation over what would be determined by prior art calculations. On the other hand, a region of abnormally low density may occur from salt bodies (2.10) or shale diapirs. In such a case, the overburden stress is abnormally low compared to what would be determined by prior art methods. In either case, even if the effective stress could be determined from seismic velocity measurements, a formation fluid pressure determination based on a prior art density model would be invalid.

In prior art, it is common to extrapolate away from a control well to derive an initial pressure model. When abnormally pressured sediments are present having higher porosity and lower density than sediments in the control well, the model of increasing density with depth is violated and the confining pressure is overestimated.

There is a need for a method to image subterranean formations which are responsive to potential fields and non-potential fields data. The present invention combines these data types to extract more useful information than either data type has provided before.

There is a need for a method for accurate determination of fluid pressures in the subsurface that (1) does not require the availability of density logs and (2) can more accurately determine the density of the subsurface in 2D or 3D away from and deeper than the limits of density from well control. Such a method should preferably be able to obtain fluid pressure even in the presence of anomalous formations that have densities significantly different from those expected in normal sedimentary columns or that predicted by density values in single or multiple wells. The present invention satisfies this need.

SUMMARY OF THE INVENTION

The present invention is a method for determining a parameter of interest of a region of interest of the earth. At least one component of potential fields data is measured at a plurality of locations over a region of interest including a subterranean formation of interest. The potential fields data are selected from magnetic data and gravity data. An initial geophysical model is determined for the region including the subterranean formation of interest. For the model, geophysical tensor data is updated using a forward model at a plurality of locations using an interior method for constrained optimization. A difference between the estimated model value and the measured value of the potential field measurements are determined at the plurality of locations. Based on the this difference the geophysical model is updated. The model is iteratively updated and compared to the measured data until the differences reach an acceptable level and the parameter of interest has been determined.

The present invention incorporates a robust inversion process for determining parameters and geologic structure representing subterranean formations using vector and tensor potential fields data, both gravity and magnetics. One or more components of potential fields vector and tensor data are measured at a plurality of locations over a region including the anomalous formation. The potential fields may be either gravity fields or magnetic fields, vector and/or tensor. A geophysical model of the region including the anomalous formation is determined using gravity, magnetics, seismic or a combination of these. A value of the one or more components of the potential fields vector and tensor data at the plurality of locations is estimated for the model. A difference between the estimated values and the measured values at the plurality of locations is determined.

The model of the region is updated based on the difference. The estimate of the value of the one or more components, the determination of the difference and the updating of the model is repeated until the difference reaches a minimum value. The updated model is used to determine the parameter of interest. Abnormal densities in the subterranean formations are commonly associated with a salt body, a shale diapir, and extrusive or intrusive igneous bodies. In one embodiment the parameter of interest can be combined with seismic data representing the same parameter for depth imaging to provide a geologic depth model and to derive a velocity model. In another embodiment, seismic data can be introduced into the inversion process to further refine the lower boundary parameter predictions. The process of inversion followed by seismic imaging followed by another inversion and seismic imaging step is repeated until the results of the gravity magnetics inversion and the seismic imaging processes converge to a single answer. The seismically determined velocities give an estimate of the effective stress while the inverted density model gives the overburden stress. The difference between the overburden and the effective stress is the fluid pressure.

DESCRIPTION OF THE PREFERRED EMBODIMENT

Figure 1:
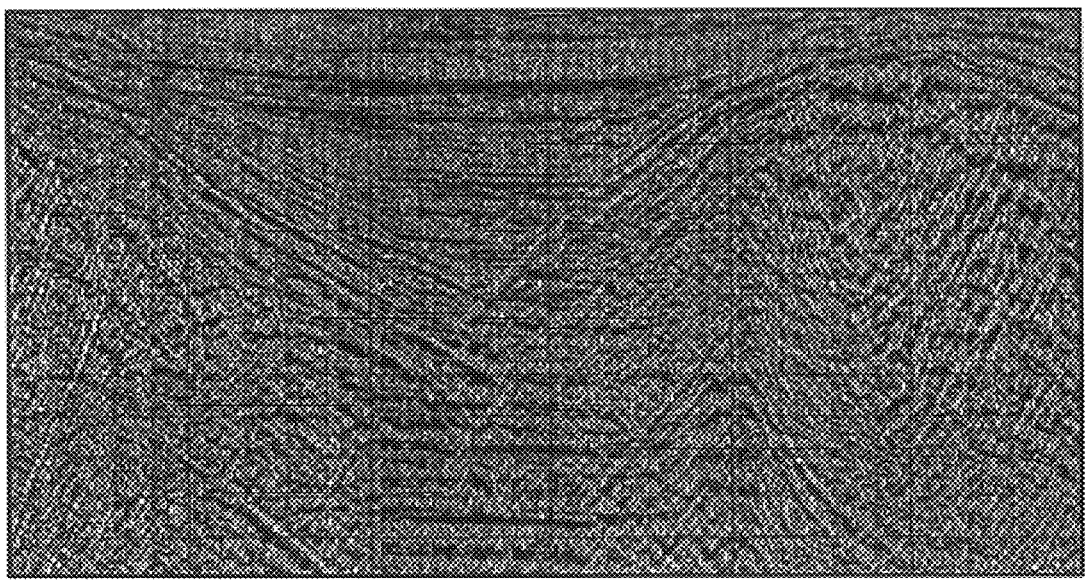
FIG. 1 is a seismic section of an area having anomalous density zones such as a salt dome.

The present invention utilizes a very robust formulation for calculating gravity, magnetic and tensor fields due to a parameterized model such as salt formations embedded in a known or assumed distribution of sediments. The embedded model is composed of an upper boundary, usually mapped with seismic methods, and a parameterized lower boundary to be determined by an inversion process. The parameterized lower boundary first uses gravity and magnetic data to predict parameters. Then, seismic data can be combined to provide a depth image using the predicted parameters as the driver. Further, a velocity model can be derived using the predicted parameters. In the alternative, the seismic data may be used as an additional constraint in running the inversion process again. This process of inversion followed by seismic imaging followed by another inversion and seismic imaging step may be repeated until the results of the potential fields inversion and the seismic imaging processes converge to a single answer or a point of diminishing returns is reached. Otherwise, if the process results begin to diverge indicating that there is not a unique solution, the process is discontinued.

U.S. Pat. Nos. 6,278,948, No. 6,424,918 and No. 6,430,507, and U.S. patent application No. 09/580,563 having the same assignee and the contents of which are fully incorporated here by reference, disclose methods and apparatus in which a gravity and magnetics inversion technique developed for use with gravity, Full Tensor Gradiometry (FTG) gravity and magnetics can be used as a driver for building earth models for seismic data processing. Some of the disclosures of the '948, '918 and '507 patents and the '536 application are included here for convenience.

This formulation of the present invention makes it possible to build an inversion process to predict the lower boundary parameters so as to minimize the difference between any or all of the model fields mentioned above and their measured counterparts. Since this inversion process is so robust and applicable to so many varied field measurements, it is useful for exploration at both regional and prospect scales.

The inversion process of the present invention demonstrates its strength in several areas. In the area of background sediment properties, the density and susceptibility can have any horizontal variability including discontinuities. The depth variation of these properties is assumed to be a polynomial up to order six for density and order five for susceptibility. Thus, for practical purposes, there are no apparent restrictions on the variability of density and susceptibility especially considering the inherent resolution of gravity and magnetic analyses.

For three dimensional inversion, the forward model fields and associated sensitivity matrix components, (partial derivatives of the model fields with respect to the parameters representing the lower boundary), used in the inversion process can be calculated in a two dimensional integration routine simultaneously. This fact makes the three dimensional inversion tractable.

For two dimensional inversion, the problem can be contracted to a one dimensional integration routine allowing inversion steps to be done extremely rapidly. This inversion is used to model single profiles of field data. Two point five and two point seven five dimensional inversions are also applied to single profiles of data. Rather than assuming the model to be infinitely extended on both sides of the profile, the two point five model has finite but equal extensions on both sides of the profile, whereas the two point seven five dimensional model has unequal extensions. Both types of inversions can be processed very rapidly by utilizing the three dimensional framework. Furthermore, this allows off profile variations of the model to be entertained by either predicting them in the inversion process or by setting them a priori based on seismic and/or other available information.

Computations based on parallel computing techniques are very fast for three-dimensional models. The inversion process setup is ideal for using multiple processors. Thus, the elapsed time previously required for large three dimensional inversion processes can be greatly reduced. This is especially important for regional studies where large data sets are required.

For data preparation, the forward modeling portion of this inversion software is also used to correct the gravity, magnetic and tensor data for complex bathymetric effects. Bouguer corrections are made assuming a depth dependant density in order to obtain better input gravity and tensor data for the inversion process. This represents a substantial improvement over the standard use of a constant Bouguer density.

Those versed in the art would recognize that numerous corrections are applied to magnetic data measurements to get a better representation of the magnetic field. These include a diurnal correction to correct for magnetic field variations during the day, an International Geomagnetic Reference Field (IGRF) correction, and a leveling correction to resolve misties between data acquired at different times. The present method works equally well whether or not a reduction to pole correction is made: such a correction corrects for the effect of an anomalous body depending upon its position with respect to the magnetic poles of the earth.

Some of the major problems confronting the application of any modeling technique applied to potential field data is the removal of the regional field and, thus, the isolation of the field believed to be associated with the scale of the model being examined. By properly filtering the data between successive iterations in the inversion process, predicted regional fields can be obtained for the gravity and magnetic data sets simultaneously, thus allowing convergence to a common model structure that explains both the band-limited gravity and magnetic fields associated with the anomalous body. The resulting regional fields then can be modeled to predict deep seated structures beneath the area of immediate interest.

Part of the inversion process that dramatically improves the convergence and efficiency of the algorithm is a predictive filtering procedure that reconstructs the regional field from the inversion itself. At each inversion step, the inversion estimates the anomalous body model that is required to fit the data and compares this model response to the observed field. The difference between the model and the observed field is treated as a "residual" or "error", the long wavelength component of this error field is calculated and attributed to the regional field that must be accounted for in the regional model. This long wavelength residual is used to reconstruct the regional model and this reconstructed regional model is compared to the long-wavelength regional component that is removed early in the preprocessing of the potential fields data to make sure that the signal used in the inversion was properly separated between signal related to the anomalous bodies and that related to the regional field.

A preferred embodiment of the present invention also includes a step for processing the tensor data to make sure that the data are consistent in the model that they will invert to. Effectively, this is a process where a flat model is used and densities are imbedded in the model to properly determine the long-wavelength filter that must be applied to the data so that the Laplace Equation is not violated when the inversion is run. This contrasts with prior art methods that use a simple band-pass filter to remove the long wavelengths and derive a residual field. If that is done blindly in the same way for each tensor component, the answer will be wrong because the different components of the tensor data will be inconsistent with each other and not satisfy the Laplace Equation. The new method determines the proper filter for each tensor component and then filters that component so that the earth model used to filter the 5 independent tensors is internally consistent. When this is done properly, it assures that the tensor residuals are correctly treated so that they can converge to a single earth model in the inversion process. This approach is also used to remove the high-frequency white noise as well, and is used to make the entire frequency band in the residual field consistent.

The method of this invention utilizes base functions equivalent to those used in half cosine transforms for parameterizing the lower boundary. However, it should be emphasized that essentially any orthogonal set of functions can be substituted with minimal effort. For example, it may be found that a power series or Legendre polynomials may provide better convergence in the inversion process. Examples of other orthogonal basis functions which may be utilized include the Daubechies wavelet set DAUB4 to parameterize the lower boundary of the subterranean formation of interest. A sliding boxcar function with variable width may also be used.

An important aspect of this invention is that the observation positions can be distributed arbitrarily, thus removing the need to have the data in a gridded form on the same datum. This is especially important when simultaneously inverting different data sets, for example data sets from various contractors may have very different acquisition characteristics including geographic grids. Also, individual field observations may be weighted in the inversion process according to their uncertainty.

FIG. 1 is a seismic section illustrating an area of interest having highly anomalous density zones such as salt domes. A rounded interface can be seen as masking the formations below. For this data set, the lower boundary cannot be determined by normal seismic data processing methods.

Figure 2:
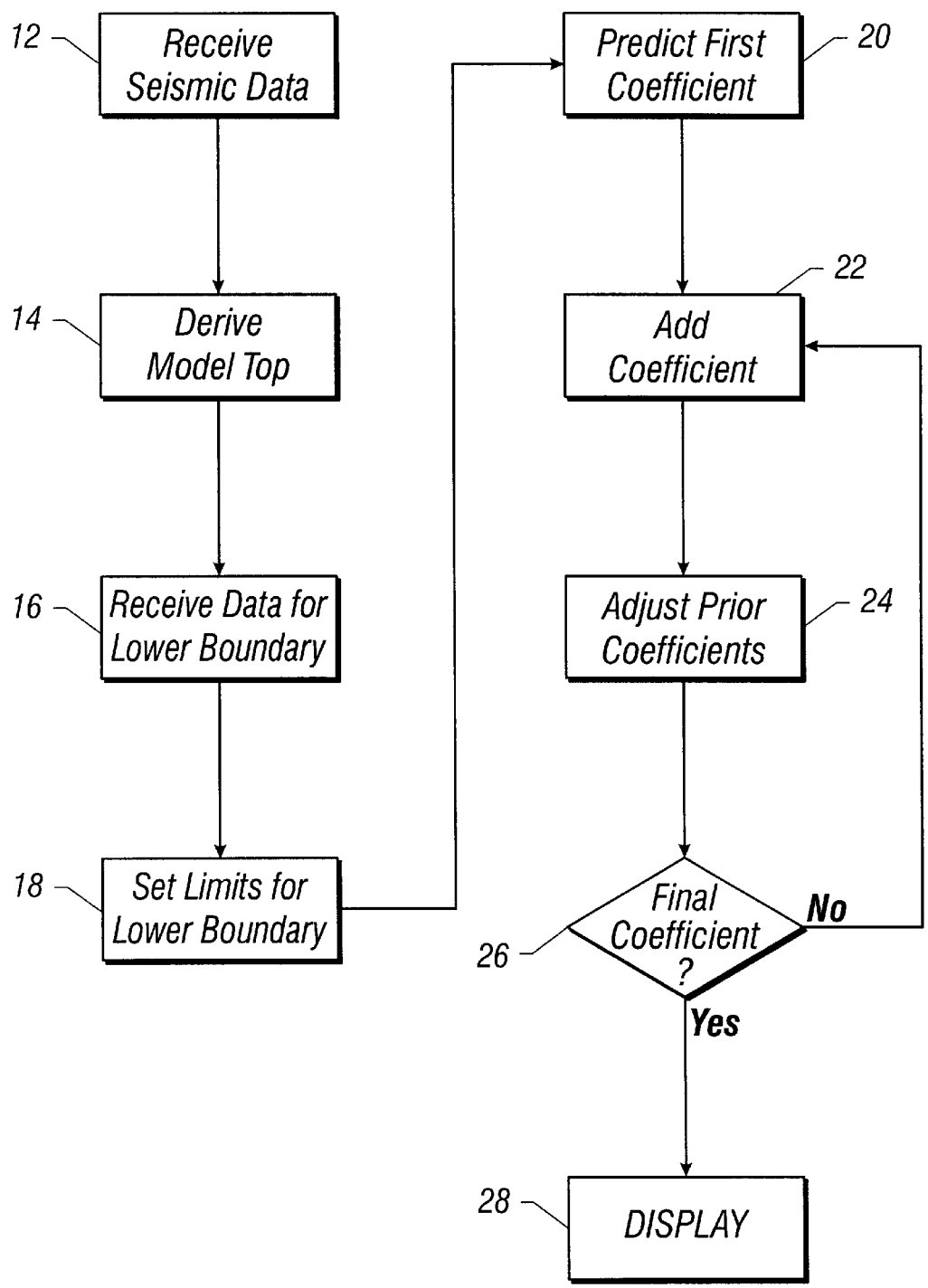
FIG. 2 is a flow chart of a method for modeling geological structures beneath anomalous density zones.

Referring now to FIG. 2, a flow chart illustrates a method for providing a model upon which derivation of subsurface formations can be based. At block 12 reflection seismic data is received. In general, reflection seismic data is more reliable than other forms of geologic exploration data in most situations because of the extensive work and research that has been devoted to its use and application.

At block 14, the reflection seismic data is used to derive the top portion of a geologic model. As stated previously, reflection seismic data is very reliable, at least in this situation, for determining a model containing the top of an anomalous density zones. Geologic boundaries beneath the top of an anomalous zone or boundary are not as easily modeled. While reflection seismic data is generally more reliable than other forms of geological surveying, anomalous density zones, such as a salt dome, block or highly distort seismic reflection information below the boundary or zone. In this type of area, reflection seismic surveying becomes unreliable, as shown in the example of FIG. 1. In some cases, the reflection seismic data becomes so unreliable that no information below the salt dome can be obtained from reflection seismic exploration.

At block 16 data pertaining to the determination of the lower boundary is received. This data may take the form any potential fields data, both vector and tensor. In the formulation used herein, the type of data is of no concern since any combination of the above mentioned data can be processed simultaneously. Although these types of data generally provide less resolution than reflection seismic data, in the case of an anomalous density zone, potential field data may provide the most reliable starting point.

The data received are used to formulate the limits of the lower boundary for the geologic model block 18. The actual lower boundary derivation is done by predicting parameters representing the lower boundary through an inversion process.

Although various inversion techniques can be utilized to determine the parameters (coefficients) representing the lower boundary, one preferred embodiment of the present invention involves the successive inversion of a single coefficient at a time until all coefficients are determined. The total number of coefficients is set a-priori at block 18 based upon the minimum wavelength (maximum frequency) desired in the lower boundary. Typical lower boundaries may contain as many as nine hundred coefficients for three-dimensional models, thirty in each horizontal direction. For example, if $x_1$ and $x_2$ are the spatial limits of integration in the x direction, and $y_1$ and $y_2$ are the spatial limits of integration in the y direction, and half cosine series are used, the number of terms required in the x and y directions respectively for a minimum wavelength of $\lambda_{min}$ are:

$$n_x = \frac{2(x_2 - x_1)}{\lambda_{min}} + 1 \qquad (1)$$

and $$n_y = \frac{2(y_2 - y_1)}{\lambda_{min}} + 1 \qquad (2)$$

Thus the total number of coefficients representing the lower boundary is $n_x$ multiplied $n_y$.

At block 20, the first coefficient representing a uniform lower boundary (longest wavelength component) is predicted. This coefficient is based on the received data and represents the best fit possible with limited information.

At block 22 another coefficient is added through the inversion process. At block 24 all coefficients added thus far are readjusted through single parameter inversion in the order in which they were added to the lower boundary (from the longest to the shortest wavelength coefficients). This process continues until all coefficients ($n_x$ times $n_y$) have been predicted. At decision block 26 a determination is made as to whether all coefficients have been predicted. If they have not, the program returns to block 22 where another coefficient is added.

If all coefficients have been predicted, the program proceeds to block 28 where the lower boundary is displayed. This display may take any form currently in use in the art, such as a monitor display, a hard copy printout or be kept electronically on tape or disc.

In a preferred embodiment, the numerical integrations necessary for each step of the overall inversion process may be accomplished using a two dimensional Gaussian quadrature operator for the horizontal variables, while vertical integration is usually done analytically. Any or all of the components of the potential fields fields vectors and tensors, along with their respective partial derivatives (with respect to each of the coefficients associated with the lower boundary) are integrated simultaneously for each observation, thus saving substantial computer time. Furthermore, between each inversion for estimating a given coefficient an updated integration mask is produced to restrict the integration to the anomalous density region of the model. Another mask is utilized for each observation point to limit the horizontal extent of the integration in order to further conserve computer time. This is especially important since as many as one hundred thousand numerical integrations per observation point per component are performed, each using about one hundred thousand Gaussian nodes. Thus, for typical exploration applications, billions of integrations are necessary.

For Gaussian integration the integral is broken up into k intervals and the two point Gaussian quadrature is applied to each interval. For example, the jth interval is:

$$\int_{a_j}^{b_j} f(x)d(x) = \frac{(b_k - a_k)}{2} \sum_{i=1}^{2} w_i f(x_i) \qquad (3)$$

where $w_i=1.0$, and $$x_i = \frac{(b_k - a_k)}{2}x_i' + \frac{(b_k + a_k)}{2} \qquad (4)$$

with $x_i'$ being simply:

$$x_1' = -x_2' = -\frac{1}{\sqrt{3}}$$

Thus, the total integral is $$I = \sum_{k=1}^{K} \int_{a_k}^{b_k} f(x)d(x) \qquad (5)$$

This is easily extended to two dimensions as follows:

$$I = \sum_{k=1}^{K} \sum_{l=1}^{L} \int_{a_k}^{b_k} \int_{a_l}^{b_l} f(x,y)dxdy \qquad (6)$$

where $$\int_{a_k}^{b_k} \int_{a_l}^{b_l} f(x,y)dxdy = \frac{(b_k-a_k)(b_l-a_l)}{4} \sum_{i=1}^{2} \sum_{j=1}^{2} w_i w_j f(x_i, y_j) \qquad (7)$$

with $w_i=w_j=1.0$, and, as before, $$x_i = \frac{(b_k - a_k)}{2}x_i' + \frac{(b_k + a_k)}{2}$$

and $$y_j = \frac{(b_l - a_l)}{2}y_j' + \frac{(b_l + a_l)}{2}$$

where $x_i = y_j'$, and $x_2 = -x_1 = 1/\sqrt{3}$

Thus, the entire integration process is controlled by determining the number of intervals K and L that are used to represent the overall integration limits of x and y and, therefore the values for the $a_k$, $b_k$, $a_l$ and $b_l$.

Figure 3:
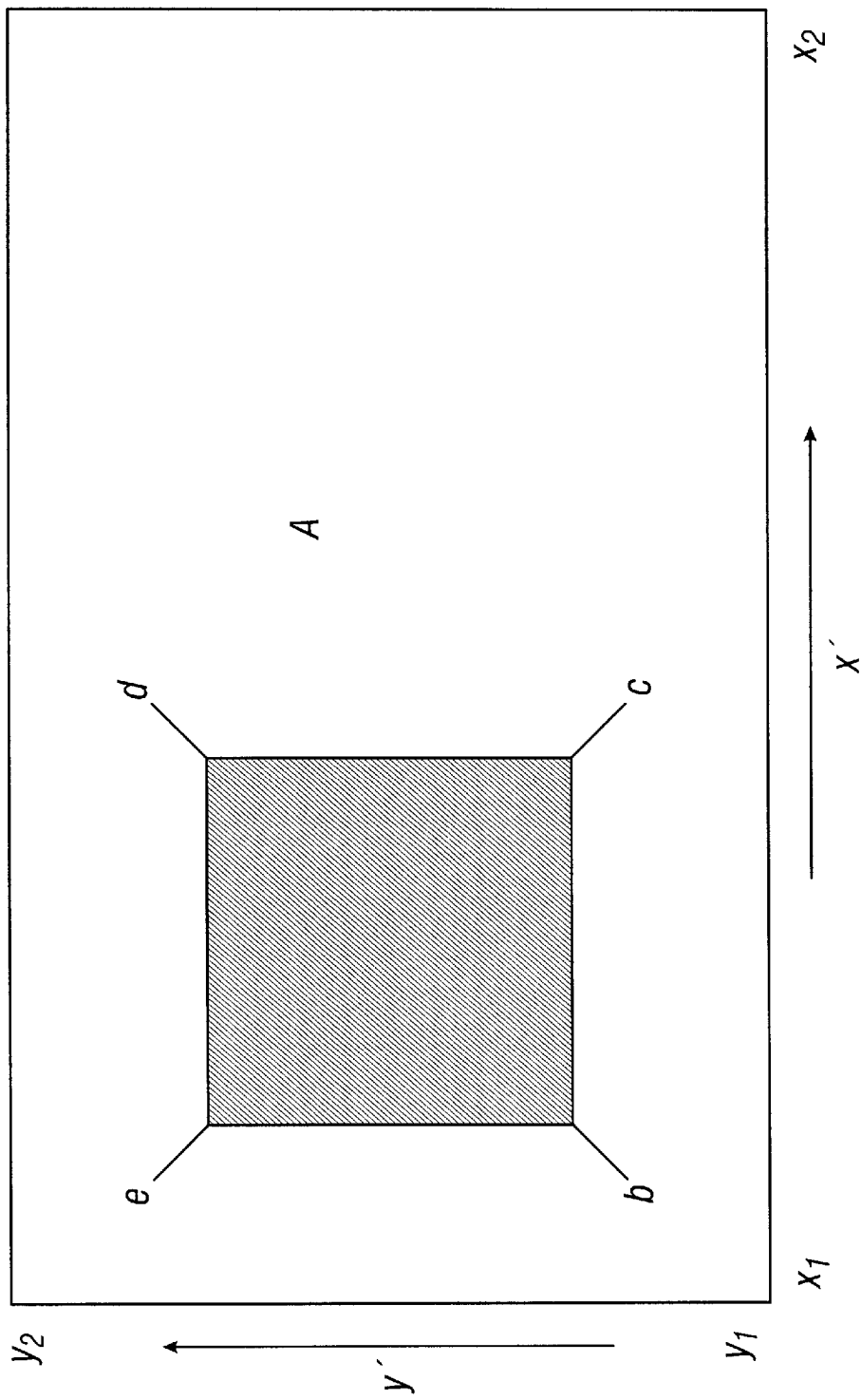
FIG. 3 is a graphical representation of the overall model integration illustrating a chosen window and observation points.

Referring now to FIG. 3, the overall model integration is illustrated. The overall integration is $x_1 \rightarrow x_2$ and $y_1 \rightarrow y_2$. As illustrated, each observation point A can have a chosen window of integration bcde that is equal to or smaller than the model integration window.

The model window of integration is broken up into K times L, a two by two Gaussian quadrature. The dimensions are given by $(x_2-x_1)/K$ units by $(y_2-y_1)/L$ units. Thus, the interval for the Gaussian points $x_i$ and $y_i$ will be approximately one half of these respectively.

All information about the distribution of the Gaussian points is calculated prior to the actual calculation along with which Gaussian points have to be utilized for model integration at each observation point. This helps make the problem of doing inversion in the spatial domain tractable.

For a given distribution of Gaussian intervals the variable boxcar function can straddle any number of these intervals in the x and y directions. Widths of one interval in each direction yielding four Gaussian nodes in each window or cell work well. Assume the base or lower boundary is flat and parameterized at a depth determined by the inversion process. For a region covered by 500 by 500 Guassian intervals one would have 250,000 parameters to solve for, given a window size of one by one intervals. For the example case of a DAUB4 wavelet function the minimum window size would be two by two intervals with a 50% overlap of windows, thus producing approximately the same number of unknown parameters which, in this case, are the coefficients of the 2-D wavelets. The vertical integration is accomplished by either solving for an analytical expression to take into account the variation of sediment properties with depth or by numerically integrating an analytical or digital expression for these properties. The digital expression would be in the form of a density and susceptibility cube.

There are a number of techniques to solve problems containing tens of thousands of calculations. A simple method that gives very good results is to invert on one parameter at a time chosen randomly. This removes large memory and CPU requirements. A pseudo-annealing process is applied by only allowing a small change in each parameter to take place during each iteration. After all parameters have been processed, a low-pass filter is applied to the surface. The iteration process is continued until an acceptable model is obtained. The randomization process between each iteration is accomplished via a random number generator. Typical inversion times are reduced with this invention from days and hours down to a matter of minutes for typical study areas.

Figure 4:
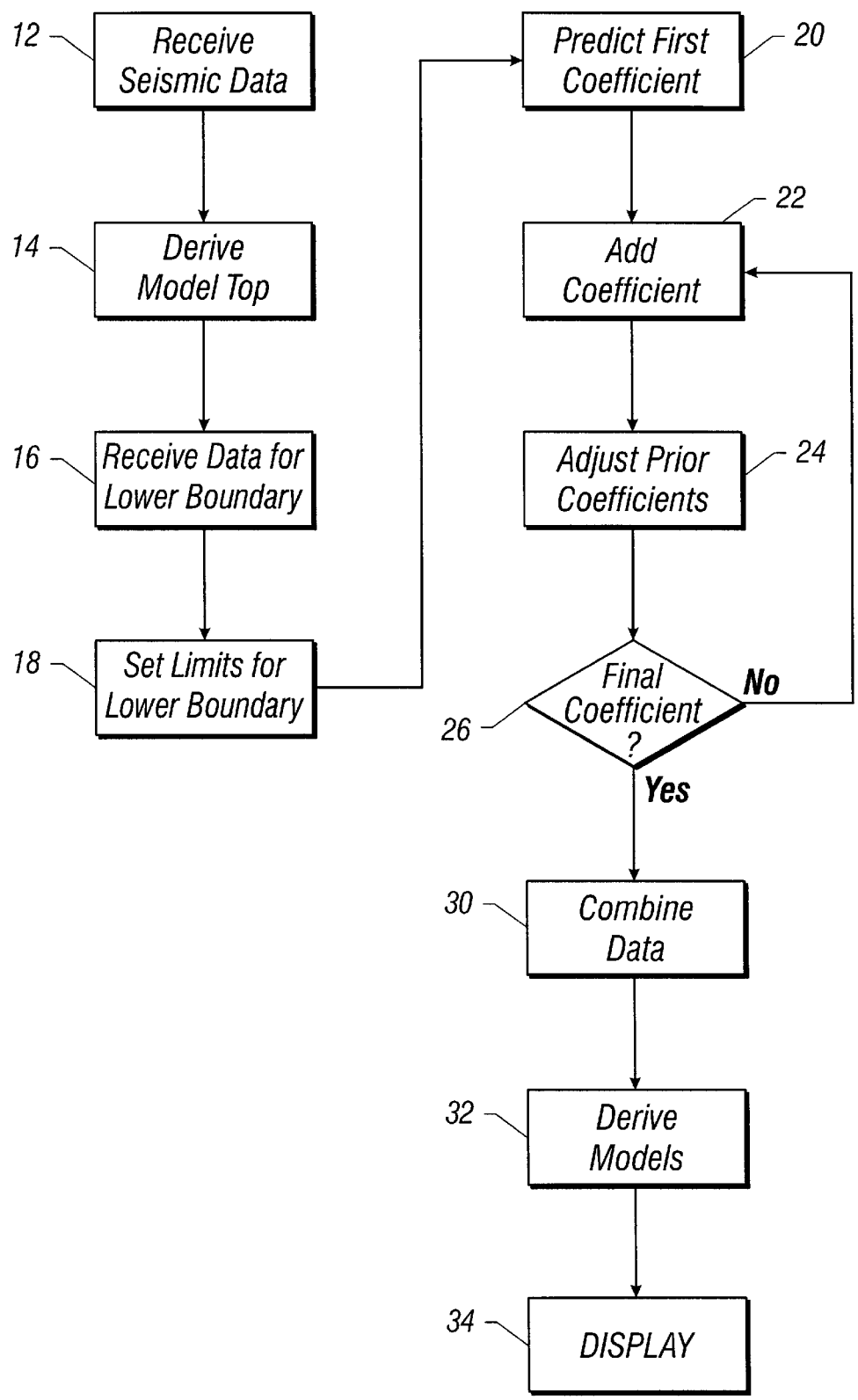
FIG. 4 is a flow chart for combining seismic data and potential fields data for modeling geological structures beneath anomalous density zones.

Referring now to FIG. 4, a flow chart illustrating a method for combining seismic and potential fields data to provide a model upon which derivation of subsurface formations can be based. This method uses the method of FIG. 2 with the addition of combining seismic data once the lower boundary has been predicted by the potential fields inversion.

The method of FIG. 2 will be briefly repeated to illustrate how the combination with seismic data is accomplished. At block 12 reflection seismic data is received to begin the modeling procedure. At block 14, the reflection seismic data is used to derive the top portion of a geologic model. As stated previously, reflection seismic data is reliable for determining the top of highly anomalous density zones. While the top portion of the model can be accurately derived using seismic data, deeper geologic features are harder to model because highly anomalous density zones block or highly distort reflection information. At block 16, data pertaining to the determination of a lower boundary is received. This data may be any potential fields data, both vector and tensor.

The received data are used to formulate the limits of a lower boundary for the geologic model for the area of interest at block 18. The lower boundary is predicted through an inversion process, as described above. At block 20, the first coefficient representing a uniform lower boundary (longest wavelength component) is predicted. This coefficient is based on the received data and represents the best possible fit with limited information.

At block 22 another coefficient is added through the inversion process. At block 24 all coefficients added thus far are readjusted through single parameter inversion in the order in which they were added to the lower boundary (from the longest to the shortest wavelength coefficients). This process continues until all coefficients ($n_x$ times $n_y$) have been predicted. At decision block 26 a determination is made as to whether all coefficients have been predicted. If they have not, the program returns to block 22 where another coefficient is added.

If all coefficients have been predicted, the program proceeds to block 30 where the predicted lower boundary is combined with seismic data representing the area of the lower boundary. The result of the inversion process produces an earth model that contains the geometric description of three dimensional and two dimensional lithologic bodies with anomalous density and velocity. These geometries and the assigned velocities and densities can be used as an input to pre- and post-stacking processing steps that require a geometrically correct velocity model. At this time, the predicted parameters for the lower boundary can be used as a driver for depth imaging.

The output at this point is a model in which the lower boundaries of the anomalous zone and its density have been determined. Knowing the density of the anomalous zone and known relationships between the density of different types of rock types and the velocity of elastic waves in such rocks, an updated velocity model may be obtained. This is done at block 32. The model may then used as input to seismic processing methods, for example, velocity analysis, Kirchhoff migration, Dip Moveout (DMO), finite difference migration, F–X migration, etc., to improve velocity estimates as well as depth and time images of the subsurface.

Once new models have been formulated, the program proceeds to block 34 where the newly derived model using the gravity/magnetic data is displayed. This display may take any form currently in use in the art, such as a monitor display, a hard copy printout or be kept electronically on tape or disc or other suitable storage medium.

Figure 5:
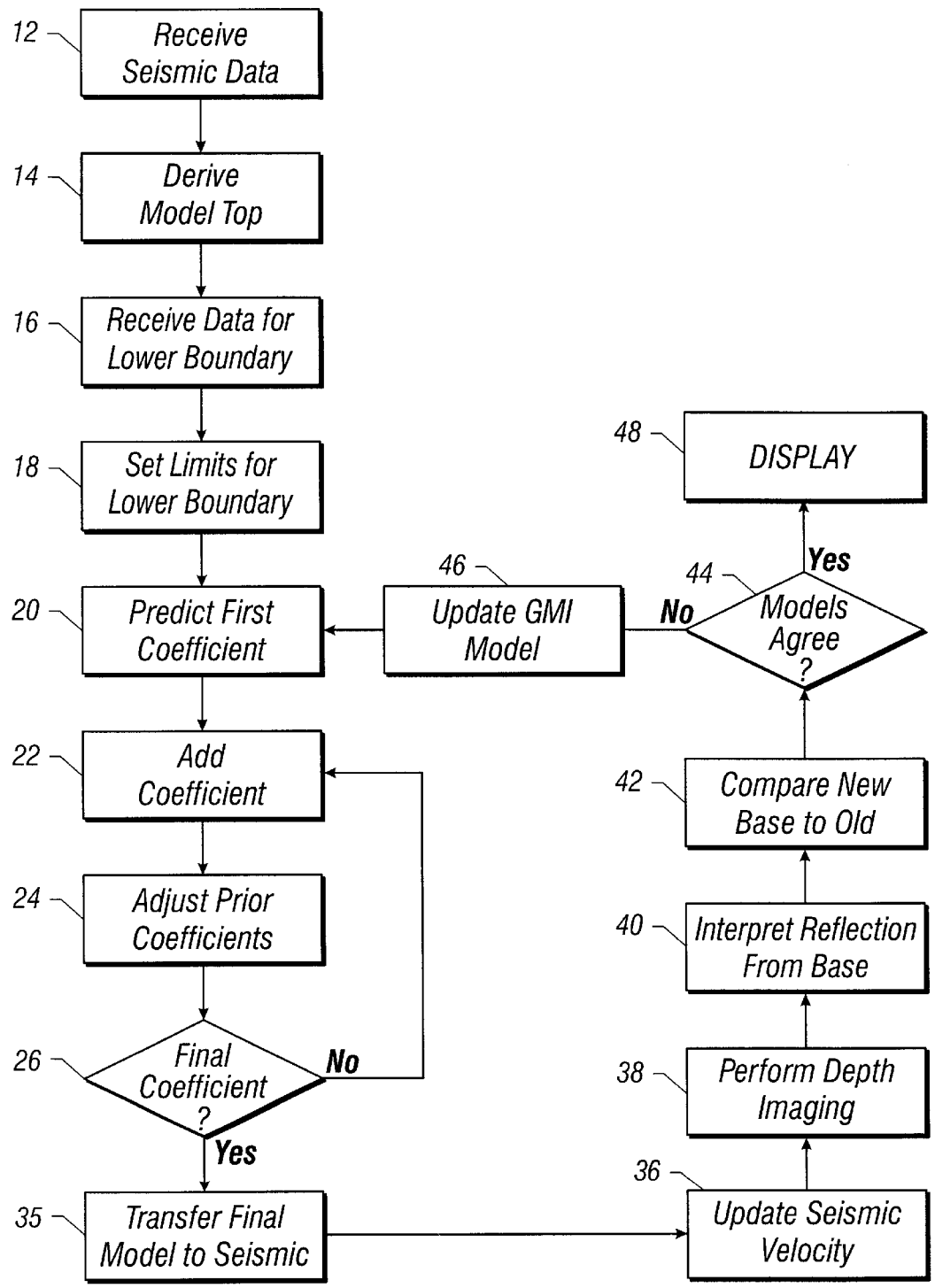
FIG. 5 is a flow chart for combining seismic data and potential fields data for modeling geological structures beneath anomalous density zones.

Referring now to FIG. 5, a flow chart illustrates a second method for, combining seismic and potential fields data to provide a model upon which derivation of subsurface formations. This method uses the method of FIG. 2 and a portion of the method of FIG. 4 with the addition of combining seismic data once the lower boundary has been predicted. The basic method of FIG. 2 will be repeated briefly again to illustrate how the combination of the inversion process with seismic data is accomplished.

At block 14, the reflection seismic data received at block 12, is used to derive the top portion of a geologic model. At block 16 data pertaining to the determination of the lower boundary are received. These data may take the form any potential fields data, both vector and tensor. Next, at block 18, the data received at block 16 are used to formulate the limits of a lower boundary for the geologic model for the area of interest as previously described.

At block 20, the first coefficient representing a uniform lower boundary (longest wavelength component) is predicted. This coefficient is based on the received data and represents the best possible fit with limited information.

At 22 another coefficient is added through the inversion process. At block 24 all coefficients added thus far are readjusted through single parameter inversion in the order in which they were added to the lower boundary (from the longest to the shortest wavelength coefficients). This process continues until all coefficients ($n_x$ times $n_y$) have been predicted. At decision 26 a determination is made as to whether all coefficients have been predicted. If they have not, the program returns to 22 where another coefficient is added.

If all coefficients have been predicted, the program proceeds to block 35 where The Gravity Magnetic Inversion ("GMI") final model is compared with the evolving seismic interpretation. The GMI model provides an additional constraint to refine the velocity model used for imaging the seismic data. Combining the gravity magnetic inversion result with the seismic data represents the beginning of a sub process that uses the inversion results as a starting earth model to derive an improved seismic image beneath the density anomaly.

At block 36, the seismic velocity model is updated. The model may be obtained as described above with reference to FIG. 4. In this step, the result of the inversion is used to drive the seismic imaging process. At block 38, depth imaging is performed using the updated seismic velocity model to better define the base of the anomalous body and underlying structure. However, portions of the subsurface may still be poorly imaged by the seismic data, partly due to errors that still remain in the evolving velocity model.

At block 40, the seismic reflection data from the base of the anomalous body is interpreted and mapped to produce an updated model for further analysis. GMI can be performed again with the new model as a constraint to solve for the remaining portions of the anomalous body that were not imaged in step 38 using the seismic data.

At block 42 the base as interpreted from the seismic reflection data is compared to the base predicted by the gravity magnetic data inversion process. A determination is made in block 44 as to whether the seismic model and the gravity magnetic model agree. If they do not agree, the process proceeds to block 46 where the GMI model is updated with the new seismic constraints in regions where the base of the anomalous body is well imaged. The process returns to block 20 to perform the inversion process again with the new constraints. This process of inversion followed by seismic imaging followed by another inversion and seismic imaging step is repeated until the results of the gravity-magnetics inversion and the seismic imaging processes converge to a single answer.

If the seismic model and the gravity magnetic model do not converge or begin to diverge, there is not a single solution consistent with all the input data. At this time the process may be terminated since the process is not having desired results. This may be due to either poor quality seismic data or some other problem with the received data. If the seismic model and the gravity magnetic model do agree, the process proceeds to block 48 where the process is ended and the model may be displayed.

Figure 6:
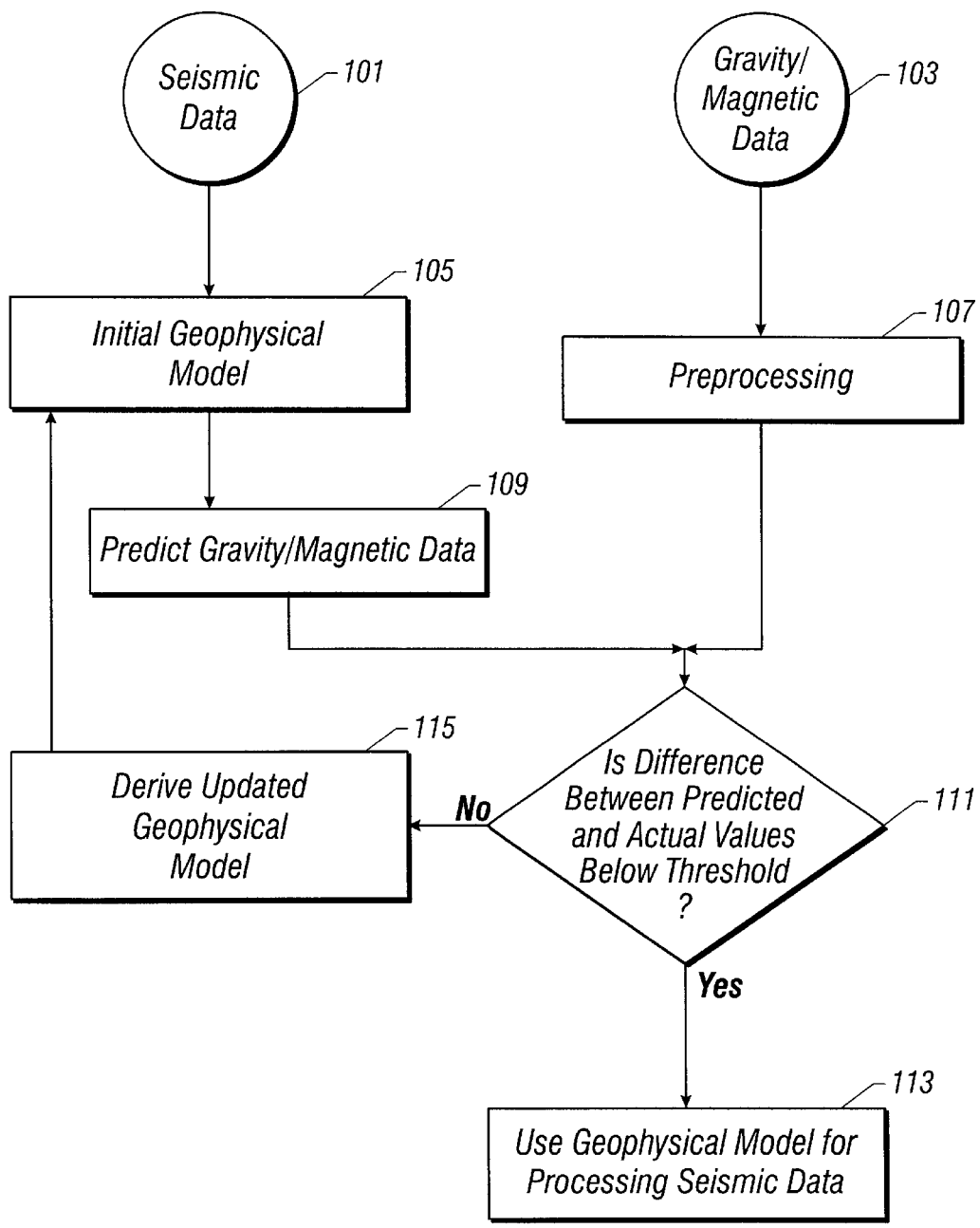
FIG. 6 is a flow chart for combining seismic data and potential fields data.

Turning now to FIG. 6, the main steps of a method for combined inversion of potential fields data and seismic data are shown. The region of earth being studied is not limited to areas of anomalous density.

Seismic data in block 101 are used for deriving an initial geophysical model in block 105. This is done by forming a seismic depth image of the subsurface structure and using subsurface velocities and/or well logs for an initial estimate of the densities. Based upon the geophysical model, a prediction is made of the gravity/magnetic data in block 109. Separately, the gravity/magnetic data, block 103, are preprocessed as described above. A comparison is made between the predicted values of the gravity/magnetic data and the actual values and this difference is compared to a set threshold in block 111. If the difference is small, block 113, then the density model of the subsurface is suitable for additional interpretation of the seismic data. If the difference is large, then an inversion of the gravity/magnetic data is performed in block 115 to give an updated geophysical model, block 115, and processing goes back to block 109.

A number of embodiments of the present invention have been described. In one embodiment, the predicted parameters are combined with seismic data to obtain a depth image and a velocity model for delineating formations of interest.

In a second embodiment, imaging of the seismic data is performed using a lower boundary determined from the initial inversion. This seismic result is mapped to determine the position of the base of the anomalous body and is compared to the model parameters to obtain a difference between the two. The parameters are adjusted to provide a best fit. A new model is formed based on the new predicted parameters, and the GMI and seismic imaging are iterated until the solution converges.

Figure 7:
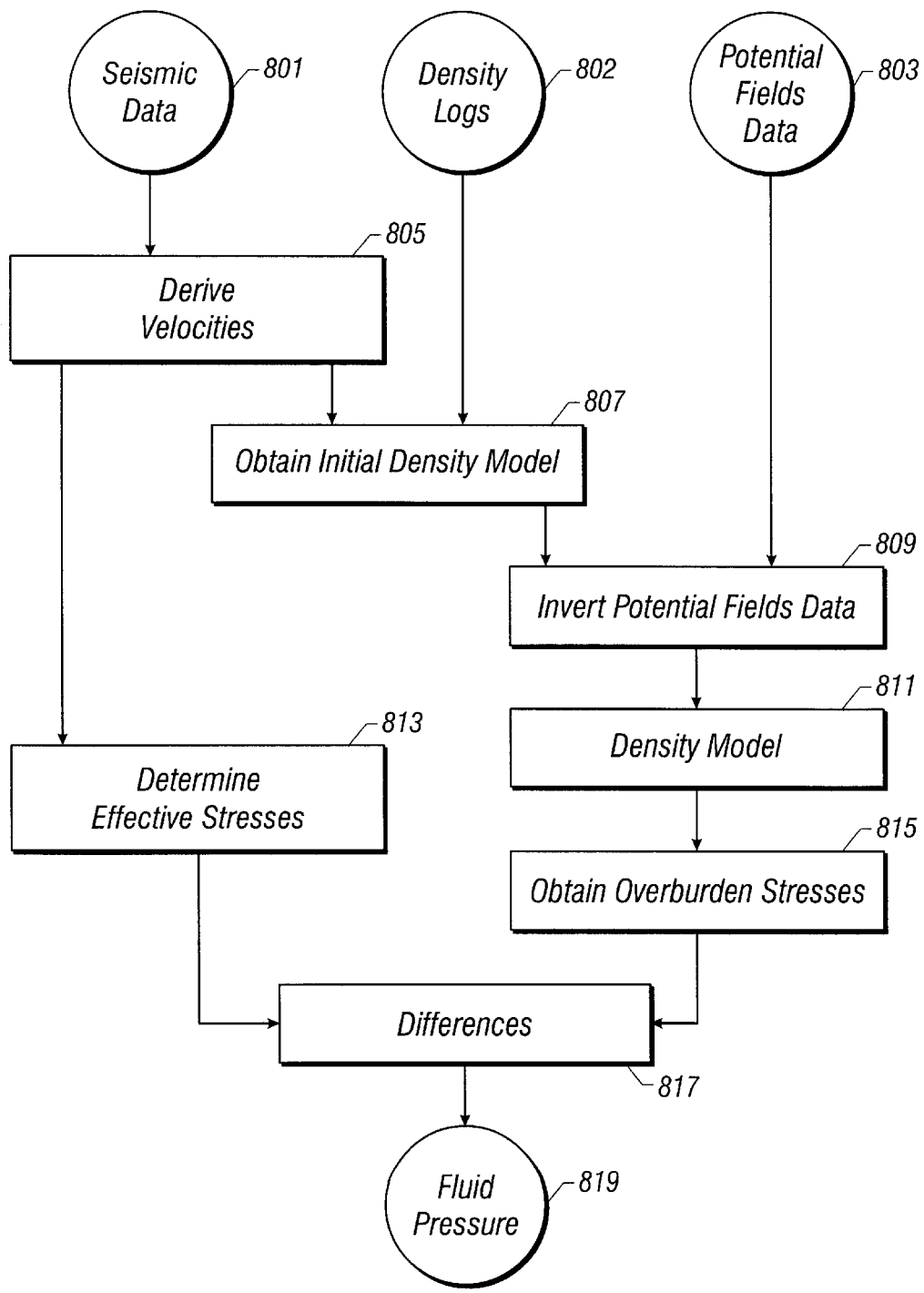
FIG. 7 is a flow chart for determining fluid pressure in a region of interest.

Referring to FIG. 7, the main steps involved in the present method of determination of subterranean fluid pressure are shown. The method uses two main types of data. The first type of data comes from a seismic survey, block 801, acquired over the area of interest. This may be in a land or marine environment and, using methods known in the art, the seismic data are processed to give an initial model of seismic velocities for the subsurface, block 805. The second type of data is acquired from a potential fields data survey, block 803. This type of data that has not been used extensively in the past for subsurface fluid pressure prediction. It includes both vector and tensor components of gravity and magnetic data. Optionally, density information, such as well logs, block 802, may also be used. The use of density logs is discussed below.

As discussed below, the potential fields data are used in determining the fluid pressure in subsurface formations. The spatial resolution obtained from this process is normally much lower than that obtained from reflection seismic data. However, models obtained from gravity and magnetic data can provide a more accurate determination of subsurface overburden loads.

The initially derived seismic velocity model is used to obtain an initial estimate of subsurface structure. Additionally, it may be used to obtain the density distribution in the subsurface using known methods, block 807. For example, Gardner (1974) has derived an empirical relation between the density of commonly observed subsurface sedimentary rock types and the velocity of propagation of seismic waves through the rocks. Alternatively, the initial values of density may be obtained using supplemental information such as density logs, block 802, from nearby wells. Density logs may be used directly as input to the density model or used with velocity data to fit a locally-calibrated Gardner relationship for a specific area. The use of the well control in conjunction with a seismic structure map makes it possible to extrapolate densities from the wells to the area of interest.

The method of FIG. 2 may be used with the initial density model, block 807, and certain constraints on the allowable densities in the inversion process to obtain a density model for the subsurface in 809. The constraints in the present invention limit the allowable values in the inversion process to a range of values around the initial density model 807.

The result of the inversion comprises a model of the density of the subsurface of the earth. This density model is then integrated with respect to depth using known methods to obtain values for the overburden stresses in the subsurface 815.

Using the velocities derived at 805, the effective stresses in the subterranean formations are determined 813. One method for relating the interval velocity V to the effective stress is a relationship of the form $$V=C+A\sigma^B \quad V=C+A\sigma^B \tag{8}$$

where V is the interval velocity, and A, B and C are determined empirically from observations. Typically, the value of C is approximately 5000 ft/s.

Other relations between the velocity and the effective stress could also be used. For example, Gassmann (1951) showed that for a packing of elastic spheres, the bulk modulus of the packing β is proportional to the two-thirds power of the effective stress.

$$\beta \propto (P_e)^{2/3} \quad (9)$$

The compressional velocity $V_p$ is related to the bulk modulus by the relation $$V_p = \left(\frac{\beta}{\rho}\right)^{1/2} \quad (10)$$

where ρ is the density. Empirically, the value of the exponent β in equation (8) is usually found to be close to ⅓, which is consistent with the value predicted by *Gassman's* model calculations in equations (9) and (10).

While a packing of elastic spheres is not a good representation of sedimentary rocks, the power law is nevertheless generally accepted to be a good empirical relation between effective stress and the compressional wave (P-wave) velocity of a rock. For example, Hamilton (1976), shows empirical data of compressional and shear velocities of water saturated sands as a function of effective stress. The data are consistent with a power law relation between velocity and effective stress.

Returning to FIG. 7, the difference between the overburden stress 815 and the effective stress 813 is determined 817 to give an estimate of the fluid pressure in the subsurface 819. This estimated fluid pressure may be used to guide the drilling process by, e.g., selecting a suitable mud weight in the borehole to avoid the risk of a kick or a blowout. Under normal conditions, the mud weight is chosen so that the pressure exerted by the column of mud in the borehole is slightly in excess of the fluid pressure in the formation but less than the pressure that could cause formation damage by forcing drilling mud into the formation through fracture failure. Accordingly, if the determined formation fluid pressure at any projected depth during the drilling of the borehole is abnormally low, the mud weight is reduced to avoid formation damage. Conversely, if the determined formation fluid pressure is abnormally high, the mud weight used in drilling is increased to avoid the danger of a kick.

In drilling operations, the mud is circulated down the drillstring to the drillbit and returns up to the surface through the annulus between the drillstring and the borehole. Those versed in the art would recognize that even if the mud weight is selected so as to not cause formation damage under static conditions, this may not be sufficient to maintain borehole integrity under dynamic conditions. During drilling, the mud pressure at the bottom of the borehole has to be sufficient to enable the mud returning from the bottom of the borehole to overcome frictional losses in the borehole, so that the bottom hole mud pressure will exceed the hydrostatic pressure of the formation. This may be sufficient to fracture the formation at the bottom hole. Accordingly, it is necessary to monitor a number of different parameters, such as flow rate of the mud, in addition to the mud weight, to maintain the integrity of the borehole. The flow rate of the mud in turn limits the weight on bit, the rate of penetration and the torque on the bit. These parameters are controlled based upon knowledge of the formation fluid pressure obtained in the present invention.

Figure 8:
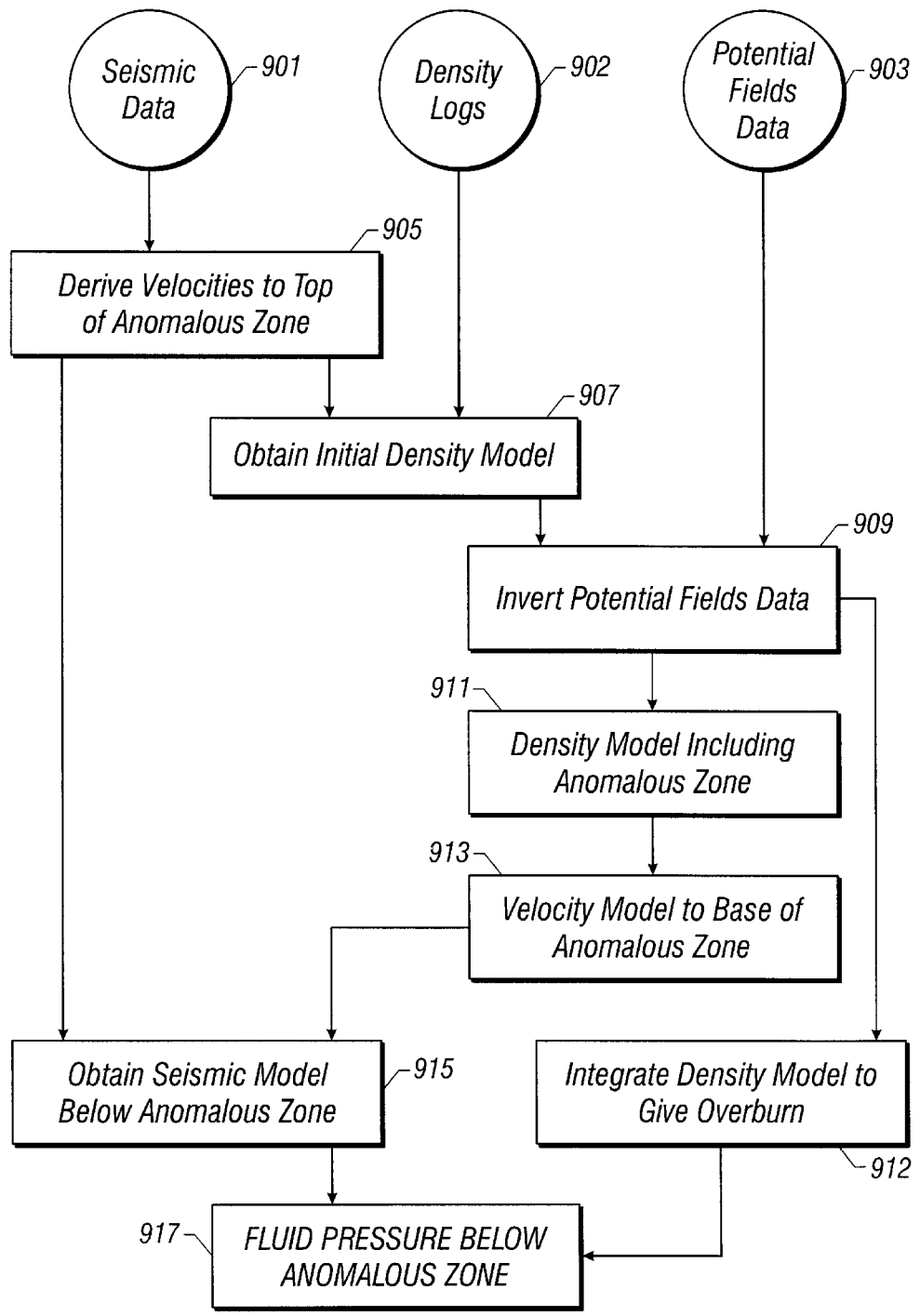
FIG. 8 is a flow chart for determining a parameter of interest below a subterranean formation of interest, like an body with anomalous density or velocity.

FIG. 8 discloses a method wherein the subsurface includes an anomalous region in which the seismic velocity and/or density is significantly different from that of the neighboring regions. An example of such an anomalous region is a salt body. As would be known to those versed in the art, a salt body has a significantly different seismic velocity than other sedimentary formations which surround the salt, making it difficult to obtain seismic images or seismic velocities below the salt body. Starting with the seismic data, block 901, an initial determination of seismic velocities to the top of the anomalous zone is made in block 905. This, as discussed with reference to FIG. 7 above, is used to derive an initial geophysical model to the top of the anomalous zone, block 907. The geophysical model includes density information that is derived either from seismic velocities or from well logs, block 902. The initial model also includes an initial estimate for the density of the anomalous zone. This is generally straightforward as the type and density of the rock in the anomalous zone would be known from geological considerations. For example, salt has a density of 2.10 g/cc and a seismic velocity of 14200 ft/s.

Using the method described above with reference to FIG. 2, the potential fields data, block 903, are inverted in block 909. The difference from this step and the inversion step, block 809, of FIG. 7 is that here, the inversion is carried out to define the base of the anomalous zone. This inverted model also constrains a velocity model for the anomalous zone: as noted above, the seismic velocities for the common types of anomalies are known. More importantly, the inversion gives an estimate of the lower boundary of the anomalous zone that can be included in an improved velocity model of the entire anomalous zone, block 913. It is then possible to use the inverted model in an improved processing of the seismic data to obtain better estimate of seismic velocities below the anomalous zone. The density model, block 911, is integrated vertically to give an overburden stress, block 912. That overburden can be combined with the seismic velocities, block 915, to determine formation fluid pressures using the method described above with reference to FIG. 7.

Where the anomalous region is a salt body, it is commonly a result of gravity-driven diapiric flow of the salt into higher density sediments. Those versed in the art would recognize, since salt is lighter than the surrounding sedimentary formations, that there would be an unloading of the overburden stress and hysteresis effects must be accounted for.

When a formation is buried and subjected to increasing depths of burial and stress, the velocity increases as expected by a model such as equation (8) or (9). When the overburden stress is reduced, either by uplift or by intrusion of salt that has a lower density than the surrounding sediments, the velocity only partially decreases, so that the velocity is higher than that given for a normally-compacted rock at the same effective stress. This hysteresis effect has been described above.

Where the anomalous body is a volcanic intrusive or extrusive body that has higher density than the surrounding sedimentary formations, the overburden stress will be higher than would be expected in a comparable depth of sedimentary rocks. The present invention is able to account for the effects of zones of anomalous density by determining the actual density, whereas prior art methods assume that density increases uniformly with depth or varies with depth based on limited well information.

One embodiment of the present invention includes a modification of the very fast inversion process explained above which produces models using vector and tensor potential methods (both gravity and magnetic data). This modification involves solving the inverse problem by using a constrained optimization approach, for example, a constrained nonlinear inversion method. The formulation allows imposing constraints on the solution as well as incorporating any geologic a priori information in the inversion algorithm. The computational speed is achieved using a conjugate gradient solver and using approximate sensitivity when required. The algorithm has the flexibility to allow an interpreter to carry out hypothesis testing, based on his geologic intuition or any other information about the model derived from any sources, for example, geophysical or geological data.

The method of this embodiment applies a constrained nonlinear inversion method using a Gauss-Newton approach. The model is parameterized using, for example, a boxcar basis function. Then the forward problem is solved using the method described above. In the inversion algorithm we invert for all model parameters simultaneously and optimally constrain parameters by imposing soft bounds on the solution. This bounded minimization problem is solved using an interior-point method. Interior-point methods are well known in linear programming. The interior-point algorithm guarantees that the solution will remain within bounds, i.e. the inverted base of salt will always be greater than (or equal to) the top of salt and less than any prescribed upper bound. This formulation has many model parameters compared to the data, which leads to an underdetermined problem. Therefore, to address the non-uniqueness issues, we minimize a model objective function subject to fitting the data. The choice of this model objective function is generally geologically driven. For example, we can impose smoothness criteria in some regions of the model and also allow sharp features to be built in other regions like faults that may be based on knowledge or geological objectives. In essence this model objective function can be used to impose a constraint on the model based on apriori knowledge. For example, a topological constraint may be placed on the base of the salt model (or any other parameter) based on apriori knowledge, and geological or geophysical information of the subsurface.

Since we are solving for all of the model parameters in this approach, the system of equations may require a large matrix system be solved. Using a least-squares conjugate gradient solver and using approximate sensitivity when necessary achieves an increase in computation speed. The approximate sensitivity requires less storage and allows the matrix to be stored in a sparse form with very minimal loss in the information content due to approximation. The noise in the data is handled using data weighting matrices. Appropriate stopping criteria for the convergence of the inversion process may be implemented and based on the assumption that the noise is random and has a Gaussian distribution. Other distributions may be easily incorporated into this methodology.

The constrained nonlinear inversion method using a Gauss-Newton approach leads naturally to an addressing of resolution issues for the inverted model. In the regions that are not constrained by the data, the model parameters from inversion may not be realistic. To avoid this problem, a reference model may be built into the inversion algorithm. Thus if the regions are insensitive to the data, the recovered model from inversion will reflect the reference model. This can be used to identify regions in the inverted model that are demanded by the data and thus provide a better interpretability of the results.

Figure 9:
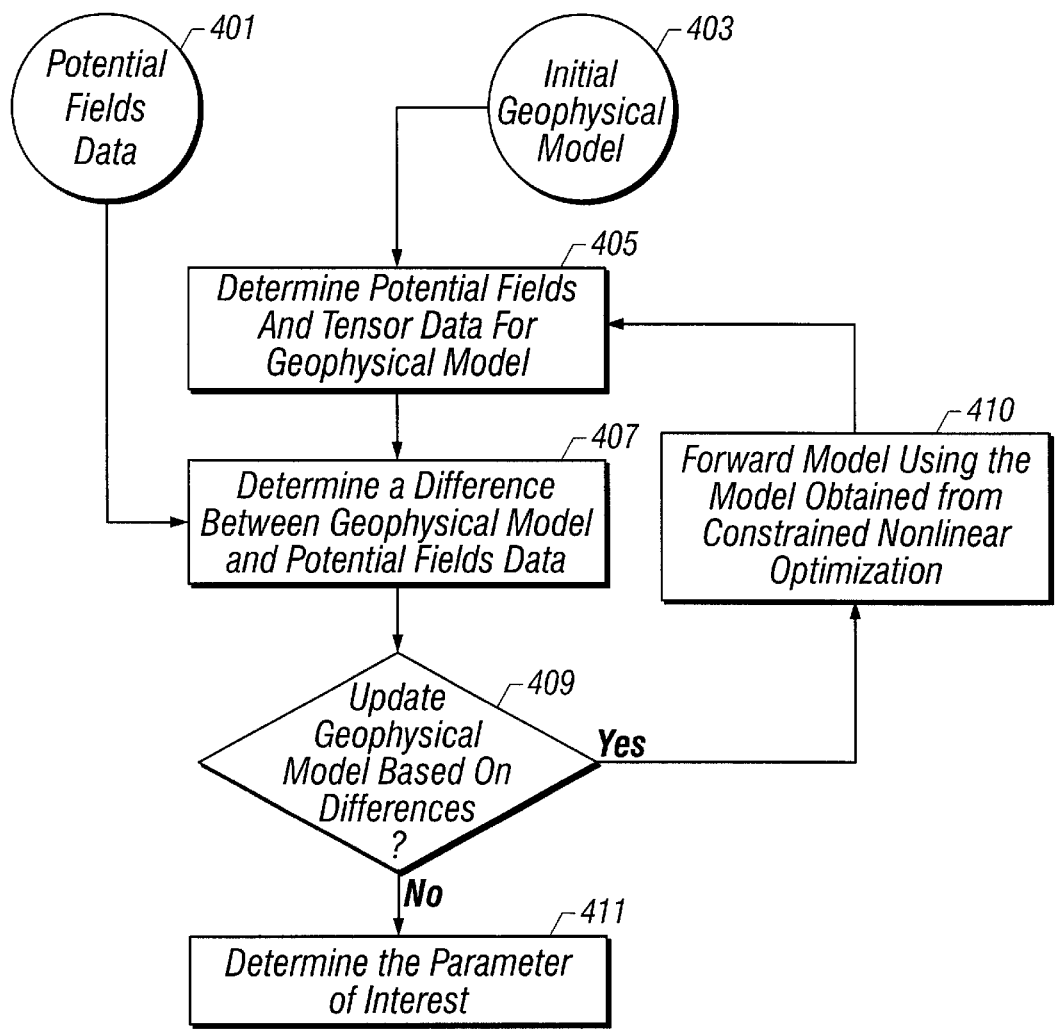
FIG. 9 is a flow chart illustrating a forward model using the model obtained from nonlinear constrained optimization.

The method of this embodiment is further explained with reference to the flow chart of FIG. 9. Potential fields data 401 are acquired for input to the method of the invention. An initial geophysical model 403 is determined or derived from apriori knowledge and/or other available data. A model potential field 405 is determined from the initial geophysical model 403. A difference is determined 407 between the acquired potential fields data 401 and the potential fields response due to the geophysical model 405. If the difference 407 is outside of a selected minimum range 409, a forward inversion process 410 is implemented through applying a constrained nonlinear inversion using a Gauss-Newton approach as outlined above: The model 405 is parameterized using appropriate basis functions; model parameters are inverted for simultaneously; soft bounds are imposed on the solution; the minimization problem may be solved with an interior-point method. The non-uniqueness of the underdetermined problem is addressed by minimizing one or more model objective functions, for example, by imposing geological constraints based on apriori knowledge or interpretations. In this manner, the estimated potential fields response 405 is compared with measured potential fields data 401 and iterated 410 until the model differences 407 are within selected limits 409.

Two other embodiments of the present invention have application to address prior art data noise problems with the use of gravity tensor technology. One of the major problems with tensor methods is the typically high noise level associated with most tensor surveys. In fact, in many cases the noise may swamp the signals believed to be attributable to geologic structures. Before the tensor data can be used for exploration purposes, a process must be applied to try to extract the signal from the measured tensor data.

Embodiments of the present invention for application to noise problems may incorporate one or both of two techniques that may be applied separately or in tandem to drastically reduce the level of noise in all five tensor channels. Barely interpretable datasets can be converted to datasets that may be almost 'geologic' in nature.

A method based on a solution of Laplace's equation works very well for merging the low spatial frequencies measured with a standard gravimeter with the entire spatial frequency spectrum measured with full gravity tensors measurements. The Laplace's equation method utilizes a solution on an arbitrary surface not intersecting the region containing the sources causing the gravity and tensor response. As an example, the method may use a 2D half-cosine transform-like function for the x and y dependence, along with the exponential function for the z dependence. Thus, the gravitation potential V(x,y,z), can be represented as a series of products of the two functions with coefficients $A_{mn}$ where m and n refer to the spatial wave numbers Kx, Ky and Kz in the x, y and z direction respectively. Kz becomes a function of Kx and Ky when this series is made to be a solution to Laplace's equation for V(x,y,z). The utility of this form of V(x,y,z) is that it can be easily included in a linear-inverse scheme to investigate the true signal in a set of gravity and gravity tensor measurements. Since the gravity field and tensor can be derived from the gravitational potential V(x,y,z), the $A_{mn}$'s can thus be estimated by fitting the observed data using various linear-inversion algorithms. This allows the components of all data channels that satisfy Laplace's equation simultaneously to be isolated from the noise. Noise may be defined as that part of the measurements that does not pass this test. The entire survey can be condensed down to a single set of coefficients $A_{mn}$. These coefficients can be used for producing arbitrary grids of all channels. In addition, various operations can be performed such as upward and downward continuation, higher-order derivative maps, etc. Furthermore, 3D modeling such as that outlined previously can be greatly simplified using output from this process. A case in point is that the modeling program can use one channel such as the second vertical derivative tensor ($G_{zz}$), since it is directly calculated from V(x,y,z), and therefore contains information from all field measurements. This fact drastically reduces CPU time and memory requirements for doing 3D modeling. Hence, the method provides the opportunity of applying more sophisticated modeling techniques to larger survey areas while using fewer resources. One further point is that this method can be applied to randomly distributed observation locations since no FFT operations are used and the whole process is model independent.

Figure 10:
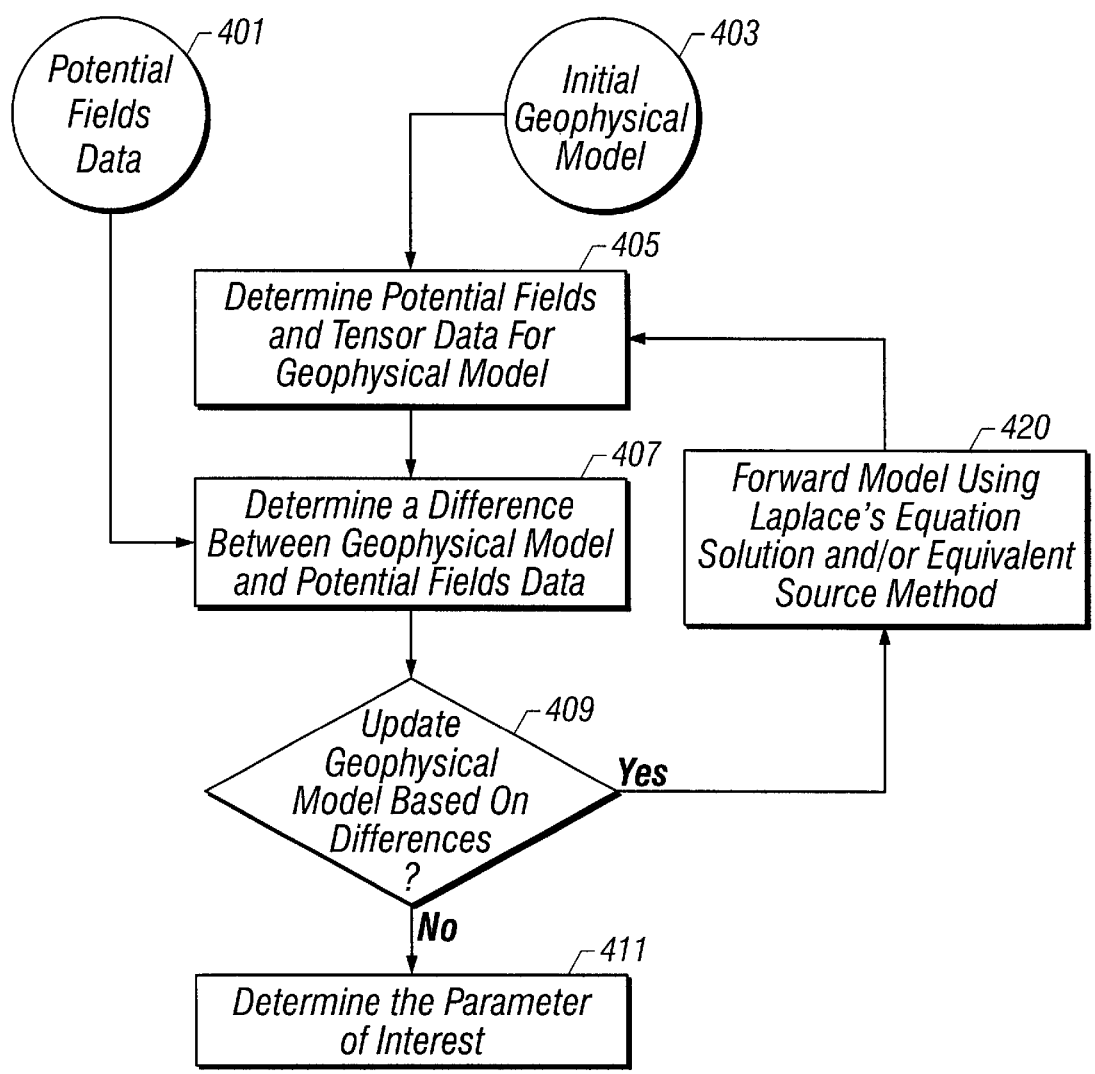
FIG. 10 is flow chart of an embodiment of the invention using Laplace's Equation and/or the Equivalent Source method.

The Laplace's Equation method embodiment is further explained with reference to the flow chart of FIG. 10. Potential fields data 401 are acquired. An initial geophysical model 403 is determined or derived from apriori knowledge and/or other available data. A model potential field as a solution to Laplace's Equation method 405 is determined from the initial geophysical model 403, using for example, half-cosine function transforms in x and y, and an z variable exponential function. A difference is determined 407 between the acquired potential fields data 401 and the potential fields response due to the geophysical model 405. If the difference 407 is outside of a selected minimum range 409, a forward modeling process 420 is implemented by applying a Laplace's Equation solution approach and/or an Equivalent Source method. In this manner, the estimated or modeled potential fields response 405 is compared with measured potential fields data 401 and iterated 410 until the model differences 407 are within selected limits 409.

Another method that may be used for data noise reduction is based on equivalent-source modeling. Equivalent-source modeling deals with the formation of an infinitely thin layer of spatially varying mass between the source(s) believed to be responsible for the measured gravity and gravity tensor fields, and the observation positions. In the case of marine surveys this layer of surface mass may be chosen to be coincident with the bathymetric surface. The method of forward modeling has been outlined previously. The main difference is that the surface density is set as the product of a two-dimensional surface density distribution function, Ms(x',y'), and a delta function with the argument (z'-Z(x', y')), where Z(x',y') is the bathymetry. This results in an analytical integration of z', thus leaving a numerical 2D integration over x' and y' for the model field calculations. In a linear inversion program, Ms(x',y') can be determined that best models the measured tensors and gravity simultaneously. Ms(x',y') is parameterized analogously to the base of salt as previously disclosed. Just as for the Laplace equation solution method, the residual fields that cannot be modeled are considered noise, and this method also can utilize randomly distributed observation points. The Laplace equation solution method and the equivalent source modeling method may be used in tandem.

The Equivalent Source method is further explained with reference to the flow chart of FIG. 10. Potential fields data 401 are acquired. An initial geophysical model 403 is determined or derived from apriori knowledge and/or other available data. A model potential field as a solution to the Equivalent Source method 405 is determined from the initial geophysical model 403, using for example, surface density set as the product of a two-dimensional surface density distribution function, Ms(x',y'), and a delta function with the argument (z'-Z(x',y')), where Z(x',y') is the bathymetry. A difference is then determined 407 between the acquired potential fields data 401 and the potential fields response determined from the geophysical model 405. If the difference 407 is outside of a selected minimum range 409, a forward modeling process 420 is implemented by applying an Equivalent Source method. In this manner, the estimated or modeled potential fields response 405 is compared with measured potential fields data 401 and iterated 410 until the model differences 407 are within selected limits 409.

While there has been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A method for determining a parameter of interest of a region of interest of the earth, the method comprising:
    (a) measuring at least one component of potential fields data at a plurality of locations over a region of interest including a subterranean formation of interest, said potential fields data selected from magnetic data and gravity data;
    (b) determining an initial geophysical model of the region including the subterranean formation of interest;
    (c) for said model, estimating a value of said at least one component of geophysical tensor data at said plurality of locations using an interior-point method for constrained optimization;
    (d) determining a difference between said estimated value and said measured value of said measurements at said plurality of locations;
    (e) updating the geophysical model of the region based on said difference;
    (f) iteratively repeating steps c–e until said difference is less than a predetermined value; and
    (g) using said updated model to determine the parameter of interest.

2. The method of claim 1 wherein determining the initial geophysical model further comprises determining a geologically driven model objective function.

3. The method of claim 1 wherein determining the initial geophysical model further comprises acquiring and processing seismic data over the region of interest and using the seismic data to derive the geophysical model therefrom.

4. The method of claim 3 wherein processing the seismic data further comprises:
    (i) determining seismic velocities in the region from the acquired seismic data; and
    (ii) using an empirical relation between seismic velocities and densities in determining a geophysical model of density.

5. The method of claim 1 wherein the region of interest includes an anomalous subterranean formation and deriving the initial geophysical model includes an upper boundary of the anomalous subterranean formation.

6. The method of claim 3 further comprising using the determined parameter of interest for processing the seismic data over the region of interest to obtain an image of said region of interest.

7. The method of claim 3 further comprising using the determined parameter of interest for processing of the seismic data giving updated seismic data.

8. The method of claim 1 wherein the subterranean formation of interest is one of the group consisting of (i) a salt body, (ii) a shale diapir, (iii) a volcanic flow, (iv) an intrusive igneous body, and, (v) an extrusive igneous body.

9. The method of claim 1 wherein the at least one component comprises at least two components of potential fields data, and the method further comprises filtering the at least two components to give filtered data components that are consistent with Laplace's equation.

10. The method of claim 1 wherein the potential fields data is at least one of (i) vector gravity data, (ii) vector magnetic data, (iii) tensor gravity data, and (iv) tensor magnetic data.

11. The method of claim 1 wherein the parameter of interest is selected from (i) a lower boundary of a subterranean formation, (ii) a thickness of a subterranean formation, (iii) a density of the subterranean formation, (iv) a magnetic susceptibility of the subterranean formation, (v) a volume of the subterranean formation, (vi) overburden stress in the region of interest, (vii) effective stress in the region of interest, (viii) formation fluid pressure in the region of interest, (ix) overburden stress below a subterranean formation of interest, (x) effective stress below a subterranean formation of interest, and (xi) formation fluid pressure below a subterranean formation of interest.

12. The method of claim 1 wherein the at least one component of potential fields data is a gravity component, the method further comprising applying to the at least one component of the potential fields data for at least one of (i) a latitude correction, (ii) a free air correction, (iii) a fixed density Bouguer correction, (iv) a variable density Bouguer correction, (v) Eotvos correction, and (vi) datum correction.

13. The method of claim 1 wherein the at least one component of potential fields data is a magnetic component, the method further comprising applying to the at least one component of the potential fields data for at least one of (i) diurnal correction, (ii) IGRF correction, (iii) leveling correction, (iv) bathymetric correction, (v) fixed magnetic susceptibility correction, and (vi) variable magnetic susceptibility correction.

14. The method of claim 1 wherein the model is selected from (i) a 2D model, (ii) a 2.5D model, (iii) a 2.75D model, and (iv) a 3-D model.

15. The method of claim 1 further comprising incorporating in the model at least one of (i) land topography, (ii) marine sea surface, and (iii) water bottom bathymetry.

16. The method of claim 1 wherein the determined geophysical model includes a density for a portion of the region outside the subterranean formation expressed as a polynomial function of depth and a laterally varying density.

17. The method of claim 16 wherein the density is based upon at least one of (i) well log information, (ii) seismic velocity information, (iii) seismic tomography, (iv) prestack seismic inversion of seismic data, (v) post-stack seismic inversion of seismic data, and (vi) regional compaction curves.

18. The method of claim 1 wherein density of the subterranean formation in the determined geophysical model is at least one of (i) a fixed density, (ii) a laterally varying density, and (iii) a vertically varying density.

19. The method of claim 1 wherein the determined geophysical model includes a magnetic susceptibility for a portion of the region outside the subterranean formation of interest expressed as a polynomial function of depth and a laterally varying susceptibility.

20. The method of claim 1 wherein the determined geophysical model includes a magnetic susceptibility for the subterranean formation of interest selected that is at least one of (i) a fixed susceptibility, (ii) a laterally varying susceptibility, and (iii) a vertically varying susceptibility.

21. The method of claim 1 wherein the determined geophysical model includes a base of the subterranean formation that is at great depth.

22. The method of claim 1 further comprising subtracting a long-wavelength field from the measured at least one component of potential fields data.

23. The method of claim 1 further comprising filtering the at least one component of potential fields data to remove a long wavelength regional component of the potential fields data prior to step (c) of claim 1.

24. The method of claim 1 further comprising using the difference at step (d) of claim 1 for filtering of a long wavelength regional component.

25. The method of claim 1 wherein the geophysical model is expressed in terms of an ordered set of basis functions.

26. The method of claim 25 wherein the set of basis functions are selected from (i) half cosine functions, (ii) Legendre polynomials, (iii) polynomials; and (vi) wavelets, (vii) Daubechies wavelets, and (viii) sliding boxcar functions with variable widths.

27. The method of claim 25 wherein the basis functions are selected from DAUB4 wavelet function set.

28. The method of claim 1 wherein a base of the subterranean formation is not allowed to extend beyond a top of the subterranean formation.

29. The method of claim 25 wherein iteratively repeating steps (c)–(e) of claim 1 further comprises solving for a higher basis function after solving for a lower basis function.

30. The method of claim 25 wherein after at least one iteration, low frequency components are filtered out.

31. The method of claim 1 wherein iteratively repeating steps (c)–(e) further comprises an integration of the geophysical model.

32. The method of claim 31 wherein the integration of the geophysical model is carried out by a set of parallel computations.

33. The method of claim 31 wherein the integration for each parameter to be inverted is chosen randomly, and further comprises:
  (i) allowing only a small change in each parameter during each iteration; and
  (ii) applying a low-pass filter to the surface after all parameters have been processed.

34. The method of claim 1 wherein the interior method for constrained optimization of the geophysical model is a bounded minimization problem solved using an interior point method.

35. The method of claim 1 wherein the interior method for constrained optimization of the geophysical model is a constrained nonlinear inversion.

36. The method of claim 1 wherein the interior method for constrained optimization of the geophysical model is a constrained nonlinear inversion using a Gauss-Newton approach.

37. The method of claim 1 wherein the interior method for constrained optimization of the geophysical model uses a conjugate gradient solver.

38. The method of claim 1 wherein the interior method for constrained optimization of the geophysical model uses a conjugate gradient solver with approximate sensitivity.

39. The method of claim 1 wherein said predetermined value is determined from at least one of the group consisting of: (i) a percentage of the datum amplitude, and (ii) an arbitrary constant.

40. The method of claim 1 wherein said differences less than said predetermined value result in distributions that are at least one of the group consisting of: (i) a Gaussian distribution, and (ii) a random distribution.

41. A method for processing gravity and gravity tensor data, the method comprising:
   (a) measuring at least one component of gravity and gravity tensor data at a plurality of locations over a region of interest including a subterranean formation of interest;
   (b) determining an initial geophysical model of the region including the subterranean formation of interest;
   (c) for said model, estimating a value of said at least one component of geophysical tensor data at said plurality of locations based on an equivalent source model;
   (d) determining a difference between said estimated value and said measured value of said measurements at said plurality of locations;
   (e) updating the equivalent source model based on said difference;
   (f) iteratively repeating steps c–e until said difference is less than a predetermined value; and
   (g) using said updated equivalent source model to determine at least one component of gravity and gravity tensor data at a plurality of locations.

42. The method of claim 41 wherein the subterranean formation of interest is one of the group consisting of (i) a salt body, (ii) a shale diapir, (iii) a volcanic flow, (iv) an intrusive igneous body, and, (v) an extrusive igneous body.

43. The method of claim 41 wherein the at least one component of gravity and gravity tensor data comprises at least two components of gravity and gravity tensor data, and the method further comprises filtering the at least two components to give filtered data components that are consistent with Laplace's equation.

44. The method of claim 41 wherein the method further comprises applying to the at least one component of gravity and gravity tensor data at least one of (i) a latitude correction, (ii) a free air correction, (iii) a fixed density Bouguer correction, (iv) a variable density Bouguer correction, (v) Eotvos correction, and (vi) datum correction.

45. The method of claim 41 wherein the model is selected from (i) a 2D model, (ii) a 2.5D model, (iii) a 2.75D model, and (iv) a 3-D model.

46. The method of claim 41 further comprising incorporating in the initial geophysical model at least one of (i) land topography, (ii) marine sea surface, and (iii) water bottom bathymetry.

47. The method of claim 41 wherein density of the initial geophysical model is at least one of (i) a fixed density, (ii) a laterally varying density, and (iii) a vertically varying density.

48. The method of claim 41 wherein the initial geophysical model includes a base of the subterranean formation that is at great depth.

49. The method of claim 41 further comprising inverting at least two components of gravity and gravity tensor data so that said inverted components satisfy Laplace's equation simultaneously.

50. The method of claim 41 wherein the initial geophysical model is expressed in terms of an ordered set of basis functions.

51. The method of claim 50 wherein the set of basis functions are selected from (i) half cosine functions, (ii) Legendre polynomials, (iii) polynomials; and (vi) wavelets, (vii) Daubechies wavelets, and (viii) sliding boxcar functions with variable widths.

52. The method of claim 41 wherein a base of the subterranean formation is not allowed to extend beyond a top of the subterranean formation.

53. The method of claim 50 wherein iteratively repeating steps (c)–(e) of claim 1 further comprises solving for the gravity and gravity tensor data simultaneously.

54. The method of claim 50 wherein after at least one iteration, low frequency components are filtered out.

55. The method of claim 41 wherein iteratively repeating steps (c)–(e) further comprises an integration of the equivalent source model.

56. The method of claim 41 wherein said predetermined value is determined from at least one of the group consisting of: (i) a percentage of the datum amplitude, and (ii) an arbitrary constant.

57. The method of claim 41 wherein said differences less than said predetermined value result in distributions that are at least one of the group consisting of: (i) a Gaussian distribution, and (ii) a random distribution.

58. The method of claim 41 wherein said equivalent source model comprises and infinitely thin layer of spatially varying mass.

59. The method of claim 41 wherein said equivalent source model comprises and infinitely thin layer of spatially varying mass coincident with a bathymetric surface.

60. The method of claim 41 wherein said equivalent source model comprises an infinitely thin layer of spatially varying mass coincident with a surface density set as the product of a two-dimensional surface density distribution function, $Ms(x',y')$, and a delta function with the argument $(z'-Z(x',y'))$, where $Z(x',y')$ is a bathymetric surface.

61. A method for processing gravity and gravity tensor data, the method comprising:
   (a) measuring at least one component of gravity and gravity tensor data at a plurality of locations over a region of interest including a subterranean formation of interest;
   (b) determining an initial geophysical model of the region including the subterranean formation of interest;
   (c) for said model, estimating a surface model value of said at least one component of geophysical tensor data on an arbitrary surface not intersecting the region containing the sources causing the gravity and gravity tensor response;
   (d) for said at least one measured component of gravity and gravity tensor data, estimating a surface measured value of said measured components on said arbitrary surface;
   (e) determining a difference between said surface model value and said surface measured value on said arbitrary surface;
   (f) updating the geophysical model based on said difference;
   (g) iteratively repeating steps c–f until said difference is less than a predetermined value; and
   (h) using said updated geophysical model to determine at least one component of gravity and gravity tensor data at a plurality of locations.

62. The method of claim 61 wherein the subterranean formation of interest is one of the group consisting of (i) a salt body, (ii) a shale diapir, (iii) a volcanic flow, (iv) an intrusive igneous body, and, (v) an extrusive igneous body.

63. The method of claim 61 wherein the at least one component of gravity and gravity tensor data comprises at least two components of gravity and gravity tensor data, and the method further comprises filtering the at least two components to give filtered data components that are consistent with Laplace's equation.

64. The method of claim 61 wherein the method further comprises applying to the at least one component of gravity and gravity tensor data at least one of (i) a latitude correction, (ii) a free air correction, (iii) a fixed density Bouguer correction, (iv) a variable density Bouguer correction, (v) Eotvos correction, and (vi) datum correction.

65. The method of claim 61 wherein the model is selected from (i) a 2D model, (ii) a 2.5D model, (iii) a 2.75D model, and (iv) a 3-D model.

66. The method of claim 61 further comprising incorporating in the geophysical model at least one of (i) land topography, (ii) marine sea surface, and (iii) water bottom bathymetry.

67. The method of claim 61 wherein density of the geophysical model is at least one of (i) a fixed density, (ii) a laterally varying density, and (iii) a vertically varying density.

68. The method of claim 61 wherein the geophysical model includes a base of the subterranean formation that is at great depth.

69. The method of claim 61 further comprising inverting at least two components of gravity and gravity tensor data so that said inverted components satisfy Laplace's equation simultaneously.

70. The method of claim 61 wherein the arbitrary surface is expressed in terms of an ordered set of basis functions.

71. The method of claim 70 wherein the set of basis functions are selected from (i) half cosine functions, (ii) Legendre polynomials, (iii) polynomials; and (vi) wavelets, (vii) Daubechies wavelets, and (viii) sliding boxcar functions with variable widths.

72. The method of claim 61 wherein a base of the subterranean formation is not allowed to extend beyond a top of the subterranean formation.

73. The method of claim 70 wherein iteratively repeating steps (c)–(e) of claim 1 further comprises solving for all components of the gravity and gravity tensor data simultaneously.

74. The method of claim 61 wherein after at least one iteration, low frequency components are filtered out.

75. The method of claim 61 wherein iteratively repeating steps (c)–(e) further comprises an integration of the geophysical model.

76. The method of claim 61 wherein said predetermined value is determined from at least one of the group consisting of: (i) a percentage of the datum amplitude, and (ii) an arbitrary constant.

77. The method of claim 61 wherein said differences less than said predetermined value result in distributions that are at least one of the group consisting of: (i) a Gaussian distribution, and (ii) a random distribution.

78. The method of claim 61 wherein said arbitrary surface comprises an infinitely thin layer of spatially varying mass.

79. The method of claim 1 wherein said arbitrary surface comprises at least one orthogonal basis function for at least one orthogonal spatial direction.

80. The method of claim 1 wherein said equivalent source model comprises an infinitely thin layer of spatially varying mass coincident with a surface density set as the product of a two-dimensional surface density distribution function, $Ms(x',y')$, and a delta function with the argument $(z'-Z(x', y'))$, where $Z(x',y')$ is a bathymetric surface.

* * * * *